Figure 1:
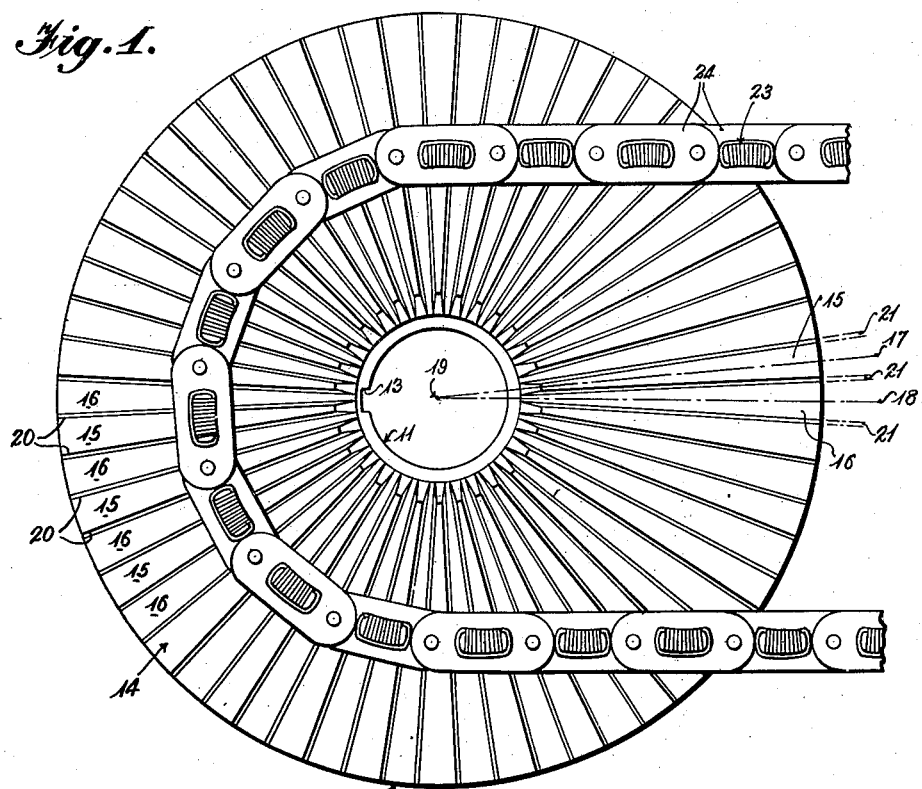

March 26, 1946. H. G. KELLER 2,397,356

METHOD OF PRODUCING TOOTHED DISKS

Filed May 20, 1943 3 Sheets-Sheet 1

Inventor

Henry G. Keller

By L. Donald Myers
Attorney

March 26, 1946.  H. G. KELLER  2,397,356
METHOD OF PRODUCING TOOTHED DISKS
Filed May 20, 1943  3 Sheets-Sheet 2
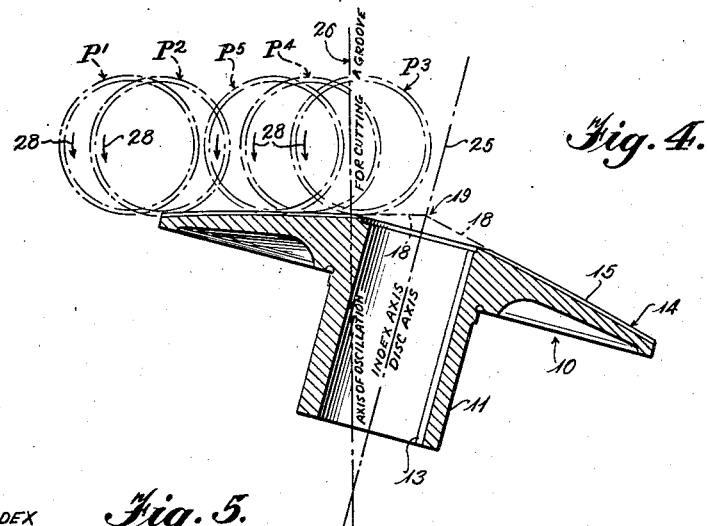
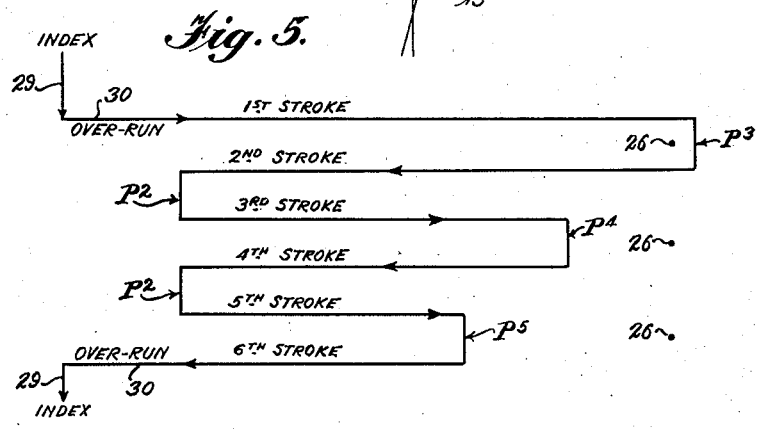
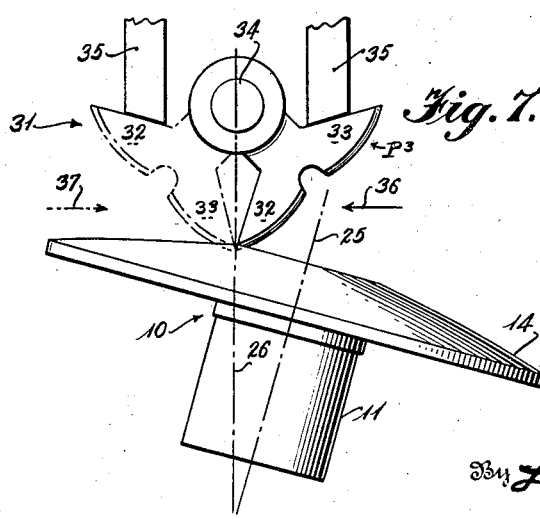
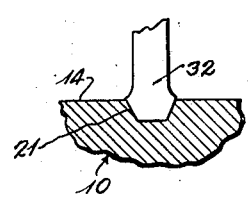
Inventor
Henry G. Keller

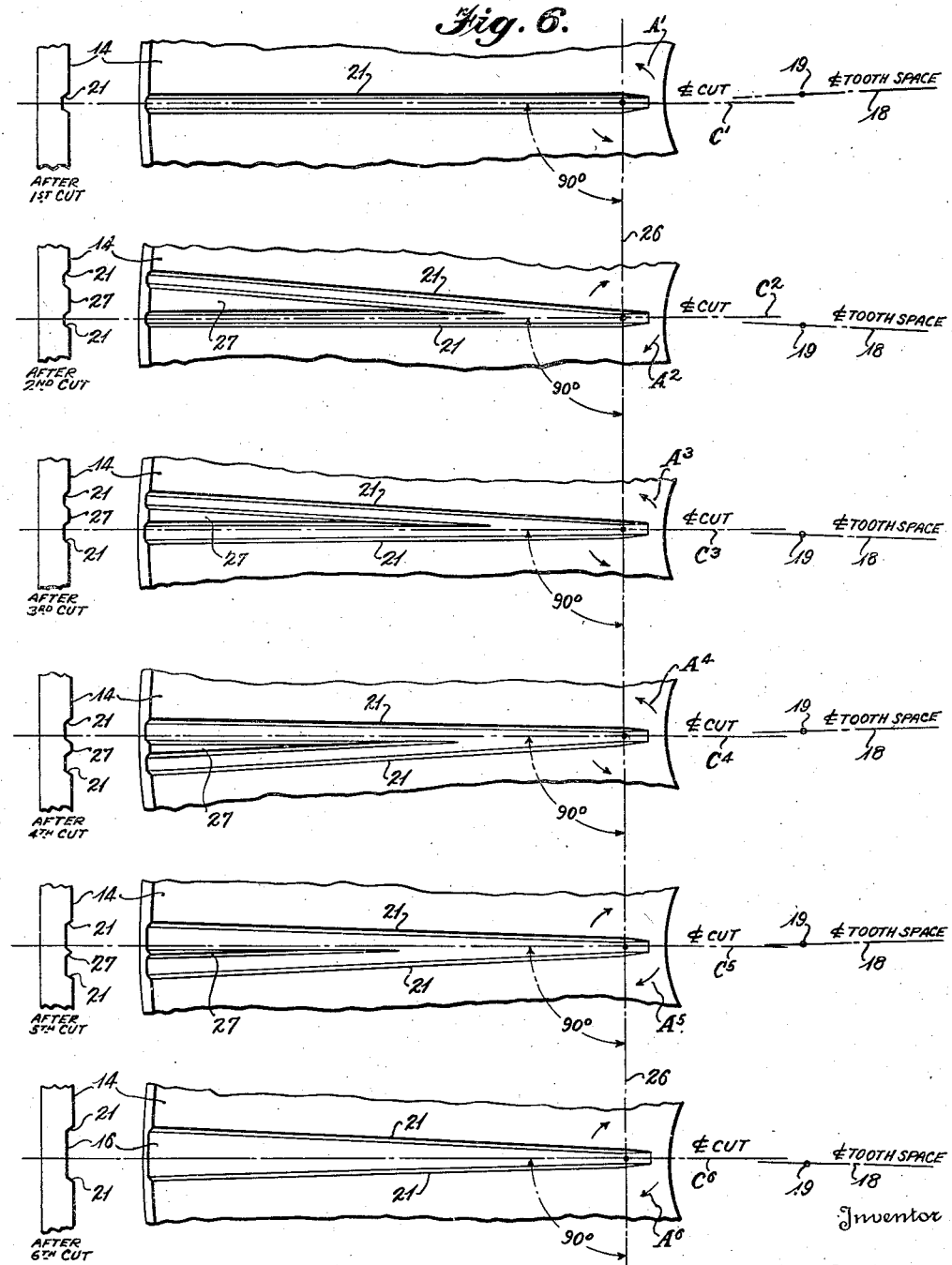

Patented Mar. 26, 1946

2,397,356

UNITED STATES PATENT OFFICE 2,397,356

METHOD OF PRODUCING TOOTHED DISKS

Henry G. Keller, Glenside, Pa., assignor to Link-Belt Company, a corporation of Illinois Application May 20, 1943, Serial No. 487,781

26 Claims. (Cl. 90—15.1)

This invention relates to new and useful improvements in methods of producing toothed disks.

Infinitely variable speed transmissions of the positive type, known commercially as P. I. V. gear, are characterized by the use of adjustable V-pulleys which consist of opposed conical disks having radial teeth cut in their faces to mesh with the transversely slidable laminations or slats that are carried in packs by the links of the chain.

In the present preferred form the teeth of these pulley wheel disks are of substantial length radially and of uniform depth. They are tapered radially or widened outwardly and are formed with beveled side faces or flanks. The spaces or grooves between the teeth are of the same tapered formation as the teeth. The center lines of both the teeth and the spaces or grooves are radial and they all intersect at the true axis of the disk. The remaining lines, such as face, pitch and root, do not radiate from the true axis.

The tooth depth lines do not radiate from a common apex point as in the case of bevel gears, which have comparatively narrow face widths whereas disks for P. I. V. gears have comparatively wide faces. The tooth depth of P. I. V. disks may be uniform or partially tapered radially, but not radially tapered from a common apex point, since the latter would produce excessive change in the tooth depth due to the wide face required.

Because of the peculiar formation of the teeth of these pulley wheel disks, conventional methods of generating bevel gears cannot be employed. Prior to the development of this invention only two fundamental principles or methods of producing these disk teeth have been created. Representative disclosures of these methods are provided by the patent to G. J. Abbott, No. 1,775,184, issued September 9, 1930, and the patent to A. Maurer, No. 1,957,028, issued May 1, 1934.

The fundamental method or principle disclosed by the Abbott patent involves a compound motion of the work relative to a fixed up-milling cutter. This compound motion includes, at the location of each groove or space, oscillation of the work relative to the cutter to develop the width of the groove and reciprocation of the work relative to the cutter for providing the cutter feed throughout the length of the groove. The work is rotated about its center or true axis for indexing to the locations of successive grooves. Cutting takes place on in-stroke only as this one cut removes all required metal to form a groove.

The oscillatory motion of the work during the entire cutting operation produces an uneven pattern or scallop effect upon the sides or flanks of the teeth as well as upon the bottoms of the grooves, the latter being so rough as to require further finishing operations, which produce certain inaccuracies which cannot be satisfactorily controlled. Furthermore, further finishing operations, at best, can only level off the high points of the scallop tips economically.

The method disclosed by the Maurer patent involves the use of a reciprocating or planer tool motion. The work is indexed to the successive locations of the tooth tops and tooth spaces or groves which are to be cut to produce the teeth. During the cutting of each tooth, the work partakes of a complicated compound motion relative to the straight line path of travel of the tool which will cause the material to be cut away throughout the desired depth and progressively widening breadth of the groove while leaving beveled faces or flanks on the sides of the teeth. As the grooves are widened radially outwardly and are of approximately equal width at their narrower ends, to the cutting edge of the tool, the compound motion of the work must be such that the cut strokes of the tool properly traverse the width of the groove while the tool penetrates to the proper depth.

The principal advantage possessed by the Maurer method over that of Abbott is the bottoms of the grooves do not require further finishing operations. The principal disadvantages are the time lost for the return strokes of the tool; the fine feed required to obtain a satisfactory finish; wear of cutter profile between grindings may produce inaccuracies in the cutting that are hard to detect; difficulties encountered in producing and setting up the control elements, such as cams, which are required to provide the complicated compound motions for producing disks of different sizes and having different tooth sizes, etc.

It is the primary object of this invention to provide a method of producing toothed faces on the disks of expansible pulley wheels used in positive, infinitely variable speed transmissions.

A further important object of the invention is to provide a method of producing toothed disks by removing material at circumferentially spaced intervals to form the radially tapered grooves or spaces that occur between the teeth with each of said disks being indexed about its true axis to locate the successive grooves and being indexed about an axis other than said true axis to locate the individual cuts of the series that is required to produce each groove.

Another object of the invention is the provision of a method of forming a groove in a disk face by means of a predetermined number of strokes of a cutting tool relative to the work with each successive stroke of the series being in a reverse direction to that of the next preceding stroke and with all of the strokes effecting cuts of uniform depth, whereby the customary idle or return strokes of reciprocating cutting tools are avoided.

Still another object of the invention is to provide a method of producing a radially tapered or widened groove in the surface of a disk by means of a series of straight line cuts that vary in length and with the work being indexed between successive cuts about an axis that is normal to the cuts and that passes through the groove in close proximity to its narrower end.

A more specific object of the invention is the provision of a method of forming the desired number of equally spaced, radially arranged and tapered teeth in the conical face of a positive, infinitely variable speed transmission pulley wheel disk by removing the material of the disk to form the grooves occurring between adjacent teeth; by indexing the disk about its true axis to locate successive grooves; by employing a combination of up-milling and down-milling to form each groove, and by pausing between the successive cutting strokes of each series, required to completely form a groove, to effect indexing about an axis which is angularly arranged with respect to the true axis of the disk.

Other objects and advantages of the invention will be apparent during the course of the following description.

Figure 2:
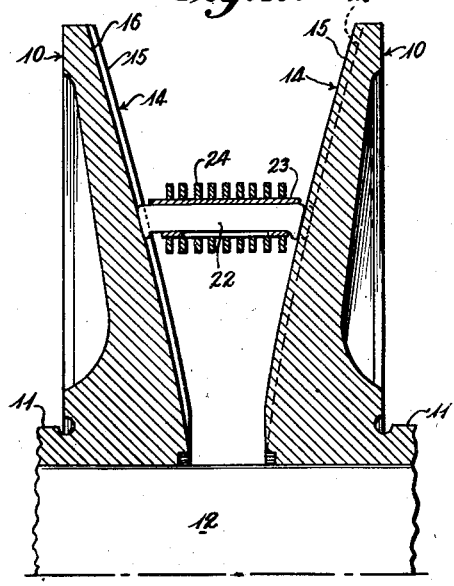
Figure 3:
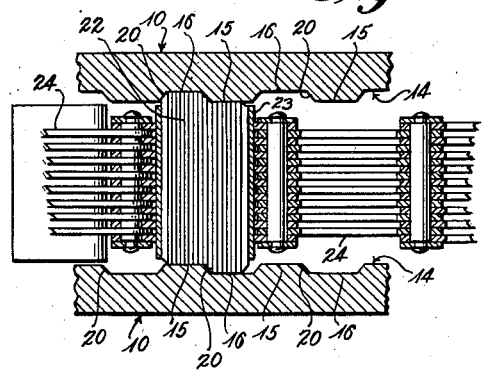

In the accompanying drawings forming a part of this specification and in which like numerals are employed to designate like parts throughout the same, Figure 1 is a side or face elevational view of one toothed conical disk of an expansible V-pulley wheel for a positive infinitely variable speed transmission, Figure 2 is a fragmentary sectional view of a pair of opposed conical disks which form one of said pulley wheels, Figure 3 is a fragmentary sectional view showing a development of a V-pulley wheel with one slat pack in meshing engagement with the teeth and spaces of opposed disks, Figure 4 is a vertical sectional view of a conical disk in the position in which it is held while having teeth cut on its conical face, Figure 5 is a diagrammatic view showing the index, overrun, and stroke movement of a cutting tool while producing a space or groove between two adjacent teeth, Figure 6 is a schematic view which illustrates the several different cuts that are made in the face of a disk in producing one space or groove occurring between two adjacent teeth, Figure 7 is a detail elevational view of a pulley wheel disk with the teeth being produced by a planer type of tool, and Figure 8 is a detail sectional view which discloses the shape of the cutting nose or tip of the planer tool of Fig. 7.

In the drawings, wherein for the purpose of illustration are shown the preferred embodiments of this invention, and first particularly referring to Figs. 1 to 3 inclusive, there is presented a disclosure of one V-pulley wheel of a positive, infinitely variable speed transmission of the P. I. V. type. It is believed to be advisable to present this disclosure so that a more thorough understanding of the problems involved in producing this type of pulley wheel disk may be had before proceeding with the disclosure of the present method.

It will be seen from these three figures that each one of the pulley wheels consists of two disks 10. Each disk includes a hub portion 11 which is adapted to be mounted for sliding movement on a driver or driven shaft 12. The hub bore may be provided with either a single keyway 13 for engaging a key carried by the shaft 12 or the bore of the hub may be provided with a suitable number of grooves for receiving splines that are formed on the shaft 12. The splined type of connection between each disk hub and its shaft is preferred. Regardless of which type of slidable connection is provided between the shafts and the pulley wheel disks, the disk teeth, to be described later, should bear a predetermined, definite relation to the key-way or the spline-ways of the disk hub.

Each one of the disks 10 is provided with a toothed face 14. For the faces 14 of two opposed disks to collectively provide a V-pulley, the faces 14 must at least be generally conical in contour. These faces need not be and preferably are not flat in any radial plane. The preferred contour of these conical faces is curved in any radial plane. The curvature may be either convex, concave or any desired combination of convex and concave. The drawings specifically disclose the conical faces as being convexly curved because that is at present the preferred contour. Whenever the term "conical" is employed in the claims, it is to be understood that the term is used in its generic sense to designate or define flat, convex and concave contours.

Each face 14 of a pair of disks 10 is provided with the same number of teeth 15. Adjacent teeth are separated by spaces or grooves 16. The teeth and the spaces or grooves are tapered radially or widened outwardly. The dash line 17 in Fig. 1 represents the center line of a tooth 15. The dash line 18 of this figure represents the center line of a space or groove 16. These tooth and space or groove center lines are truly radially arranged and they all intersect at the axis of the conical face.

The opposite sides or flanks 20 of the several teeth are beveled. The top and bottom tooth lines determining the tooth depth do not radiate from a common apex point, hence the tooth lines 41 do not radiate from an apex point or the disk axis. It will be appreciated, therefore, that the teeth of these conical disk faces differ materially from the teeth of conventional bevel gears because all of the lines of the teeth of bevel gears converge at the apex point. Because of this difference in tooth formation, methods employed for producing conventional bevel gears are not employed for producing or generating the teeth of these conical disks.

By inspecting Fig. 3, it will be seen that the teeth 15 of each disk 10 are arranged opposite the spaces or grooves 16 of the opposed disk. This staggered arrangement of the teeth and spaces of opposed disks is for the purpose of permitting the slats or laminations 22 of the packs 23 carried by the links 24 to slide transversely so that their end portions may conform to the tooth and space formations of the opposed disk faces. These slat packs, therefore, are manipulated by the teeth 15 of the two disks, as the successive chain links approach the meshing point, to "mold" each pack as a whole to the profiles of the cooperating teeth and spaces of the opposed disks. Fig. 3 clearly discloses the slats of one pack in engagement at their opposite ends with the tops of the teeth 15, the bottoms of the spaces or grooves 16 and the side faces or flanks 20 of the teeth.

Coming now to a disclosure of the method embodying this invention which results in the production of the toothed conical faces 14 of the disks 10, Figs. 4 to 6 inclusive will be employed in presenting this disclosure.

Fig. 4 discloses a disk 10 in the position it will assume while its spaces or grooves are being cut. The disk is supported by a suitable arbor, or the like, not shown, for rotation about the true axis 25. Rotation about this true axis is provided to index the disk to the several locations of the spaces or grooves that occur between adjacent teeth. Each disk is indexed about this true axis 25 after a complete groove has been cut at the location which is operatively associated with the cutting tool that is employed for this purpose. The disk is indexed a distance equal to the pitch of the teeth. For example, if sixty teeth are to be provided on the conical disk face 14, the disk is indexed 6° about the true axis 25, or 1/60 of 360°.

The disk and its undisclosed arbor are supported for bodily movement about a second axis at each space location. This second axis 26 is identified in Fig. 4 as the "axis of oscillation for cutting a groove." It will be seen that this axis 26 is normal to the center line 18 for the groove that is to be produced at each space or groove location. Because the face 14 of the disk 10 is of conical formation, the axis of oscillation is necessarily angularly arranged with respect to the true axis 25 of the disk. The angle between the two axes 25 and 26, of course, will be dependent upon the angle of the conical face 14. The two axes 25 and 26 remain fixed with respect to each other during the entire operation of cutting all of the teeth on a given disk although the disk face is moved relative to the axis of oscillation 26 when the disk is indexed about its true axis 25.

Each tooth space or groove 16 is produced by a series of straight line cuts which are so arranged relative to each other that they collectively remove all of the material necessary to produce the groove. These straight line cuts all radiate from the axis of oscillation 26. Fig. 6 clearly discloses this method of producing a groove by the series of related straight line cuts. The axis of oscillation 26 is shown in this figure. It will be seen by this disclosure that this axis 26 intersects the groove 16 at a point which is adjacent the inner, narrower end of the groove. This Fig. 6 also discloses the center line 18 of the tooth space or groove and the index or disk axis 19. As the method specifically illustrated in Fig. 6 involves the use of six straight line cuts, there are six views to this figure. The center line of each cut is illustrated in this figure to disclose its angular relation to the tooth space or groove center line 18. The center lines for the cuts bear reference characters $C^1$ to $C^6$ for the purpose of identifying the separate cuts and the different center lines. The disk 10 is oscillated in the directions of the arrows $A^1$ to $A^6$ about the axis of oscillation 26 prior to the production of each one of the cuts. By comparing the positions or angles formed by the center lines $C^1$ to $C^6$ of the cuts with respect to the center line of the tooth space or groove 18, it will be seen that the successive oscillations vary in amplitude.

As the first straight line cut to be made forms the left hand side of the groove, when the disk is viewed from its periphery, the disk must be rotated about the axis 26 in the direction of the arrows $A^1$, or in a counterclockwise direction, to line up this left hand margin of the groove with the rectilinear path of movement of the cutting tool. This oscillation of the disk about the axis 26 displaces the point 19 and the center line of the tooth space to one side of the center line $C^1$ of the first cut. This arrangement is shown in the first view of Fig. 6.

The second straight line cut that is made forms the right hand side of the groove. Therefore, the disk must be oscillated in the direction of the arrows $A^2$, or in a clockwise direction, about the axis of oscillation 26. This movement of the disk displaces the apex point 19 and the center line of the tooth space or groove 18 to the other side of the center line $C^2$ of the second cut. These two cuts converge completely at the point where the axis of oscillation 26 intersects the inner end portion of the groove or space. In fact substantially no material is removed by the second cut when the tool performing the same reaches the point of intersection of the axis of oscillation 26. These first two cuts result in defining or producing the side faces or flanks 21 of two adjacent teeth and leave a wedge 27 of material that still must be removed to complete the production of the space or groove.

The third view of Fig. 6 shows the groove after the third cut has been made. This straight line cut removes material from the right hand side of the wedge 27 and results in widening the second cut. To position the disk for this third cut, it must be oscillated about the axis 26 in the direction of the arrow lines $A^3$, or in a counterclockwise direction. This oscillation of the disk reduces the angle that is formed between the center line $C^3$ of the third cut and the center line 18 of the space or groove. Because the wedge 27 of material to be removed does not extend the full length of the partially formed groove, it is not necessary for the stroke of the cutting tool to travel the entire distance to the point of intersection of the axis of oscillation 26 and the inner end of the groove.

The fourth view of Fig. 6 shows the condition of the groove after the fourth straight line cut has been made. This fourth cut removes material from the left hand side, or the original side, of the wedge of remaining material 27. Therefore, the disk must be oscillated to a further extent in the same direction about the axis 26, or in the counterclockwise direction of the arrows $A^4$. In making this fourth cut, the stroke of the tool corresponds in length with the stroke that produced cut number 3.

The fifth view of Fig. 6 discloses the condition of the groove after the fifth cut has been made. This cut removes material from the left hand side of the wedge 27, or the same side as cut number 4. However, to position the disk for this fifth cut the disk must be oscillated about the axis 26 in the direction of arrow lines $A^5$, or in a clockwise direction. By noting the relative length of the wedges 27 in views 3, 4 and 5, it will be appreciated that the stroke of the tool for cut number 5 need not be as long as the stroke of the tool for cut number 4.

The sixth view of Fig. 6 shows the condition of the groove after the sixth cut has been made. This sixth cut removes all of the wedge 27 that remained after cut number 5. To properly align this wedge 27, that remained after cut number 5 was completed, with the path of movement of the cutting tool, it was necessary to oscillate the disk about the axis 26 in the clockwise direction indicated by the arrows A⁶. This sixth stroke of the cutting tool need be no longer than the stroke that produced cut number 5.

Let us now consider the disclosures of Figs. 4 and 5 in connection with the disclosures provided by the several views of Fig. 6.

It has been determined that the preferred way of producing the six different cuts is by means of a milling cutter of cylindrical form with teeth on the circumferential surface and on both sides, which constantly rotates in the same direction. Such a cutter is diagrammatically illustrated in Fig. 4 and the direction of rotation is represented by the arrows 28 for several different positions of the cutter. It further has been determined that considerable time can be saved by causing the cutting tool to remove material during each stroke; i. e., during the return stroke as well as during the forward stroke. It will be appreciated, therefore, that with the milling cutter rotating in the same direction at all times, the cuts for half of the strokes will be performed by up-milling while the cuts of the remaining strokes will be performed by down-milling. That is to say, if the first stroke involves up-milling, the third and fifth strokes also will involve up-milling. The second, fourth and sixth strokes then will involve down-milling.

Fig. 5 illustrates diagrammatically the relative lengths of the six different strokes. Arrows are associated with these stroke lines to indicate the alternate directions of the six cutting strokes. This Fig. 5 also discloses the location of the axis of oscillation 26 with respect to the lengths of the several strokes.

Although Figs. 5 and 6 disclose the use of six strokes to produce a complete groove or tooth space, it readily will be understood that a greater or lesser number of strokes may be employed by varying the relative width of the cutting tool and the groove or by varying the width or amount of material that is removed by the strokes which follow the first two. Variations of this character may result in the need for an odd number of strokes instead of an even number. Whenever an even number of strokes is employed, the disk will be indexed to the successive new locations of the tooth spaces or grooves while the cutter is always positioned at the same end of each groove. Fig. 5 discloses indexing arrow lines 29 which are located at the peripheral end of each groove. It is preferred that indexing be performed while the tool is positioned at the periphery of the disk. It is to be understood, however, that the tool may be positioned at the inner end of the successive grooves when the disk is indexed to a new location. If an odd number of strokes is employed to produce a complete groove, alternate indexing movements of the disk will take place at opposite ends of the grooves; i. e., one indexing will occur at the peripheral end of a groove while the next succeeding indexing will occur at the inner or axial end of a groove. However, regardless of when the disk is indexed to place a new groove or space location in operative relation to the rectilinear path of movement of the cutting tool, the tool will be caused to overrun into the position it assumes when the disk is indexed. These overrun movements of the tool will occur in advance of the beginning of the first stroke and after the completion of the last stroke. These overrun movements of the tool are represented in Fig. 5 by the lines 30 and are represented in Fig. 4 by the difference between the two cutter positions P¹ and P². That is to say, cutter position P¹ is assumed during indexing while cutter position P² represents the location of the tool when the disk is oscillated about the axis 26 to change from stroke number 2 to stroke number 3 and while changing from stroke number 4 to stroke number 5.

Tool position P³ of Fig. 4 represents the location of the milling cutter after the completion of stroke number 1 and while the cutter feed motion pauses to permit the disk to be oscillated to properly locate the path of stroke number 2 with respect to the path of reciprocation of the tool. Tool positions P⁴ and P⁵ respectively represent the locations of the milling tool during the pauses which occur while the disk is oscillated after stroke 3 has been completed and before stroke 4 is started and after stroke 5 has been completed and before stroke 6 is started. Of course, the cutter will pause while in position P² for oscillatory movement of the disk in advance of its travel through stroke 3 and through stroke 5.

It should be obvious to anyone skilled in the art that an appreciable amount of time is saved during the production of each tooth space or groove 16 by causing a cut to be made during each stroke of the tool and by stepping down or reducing the lengths of the strokes as the wedge 27 of remaining material becomes shorter. With the exception of the overrun movements of the tool, represented by the lines 30, the tool partakes of no idle or return stroke and there is no idle portion for a cutting stroke.

The bottom of each groove may be caused to assume a similar contour as the tops of the teeth by controlling the path of movement of the cutting tool with reference to the horizontal. That is to say, if the surface 14 of the disk is truly conical or is flat or straight in any radial plane, the cutter axis will traverse a plane that is normal to the axis of oscillation 26. When the face 14 of the disk is curved, the axis of the cutter will follow a correspondingly curved path. Suitable cams may be employed for effecting these different paths of movement of the cutter axis.

Although the use of a milling cutter performing alternate up-milling and down-milling strokes is the preferred method of producing the toothed faces on these pulley wheel disks, it has been determined that a reciprocating, double edged planer type of tool also may be employed for cutting the grooves or tooth spaces. Figs. 7 and 8 of the drawings disclose the use of this type of planer tool.

In Fig. 7, a disk 10 is illustrated as being supported in the same general position as the disk of Fig. 4. The disk of Fig. 7 is intended to be indexed about the true axis 25 to place the successive space or groove locations in operative relation to the path of movement of the cutting tool which is generally designated by the reference character 31. At each space or groove location the disk is intended to be oscillated about the axis 26 in the same manner as that described in connection with the disclosures of Figs. 4 to 6 inclusive. This tool 31 is intended to reciprocate through similar strokes as the milling tool of Fig. 4 and is intended to produce similar cuts as are illustrated in the several views of Fig. 6 although a greater number of cuts usually will be required.

This planer type of cutting tool 31 includes the oppositely directed cutting blades 32 and 33. This double blade member is supported for oscillatory movement by the shaft 34. Suitable stops 35 are arranged to engage and back up the cutter during its reciprocatory movements in opposite directions.

Fig. 7 discloses the double ended cutter in full lines and in dash lines. The full line showing illustrates the cutter 32 positioned at the start of a cutting stroke which will be in the direction of the solid arrow line 36. This stroke will remove a straight line cut of material from the inner edge of the conical face 14 to the periphery of the disc. Due to the length and the direction of this cut, it will correspond with stroke number 2 shown in Figs. 5 and 6.

After this stroke has been completed and the tool has reached position P² of Figs. 4 and 5, the cutter is automatically oscillated to its dash line position so that cutting blade 33 will be in readiness to produce a straight line cut when moved in the direction of the dash arrow line 37. The tool, of course, will continue to reciprocate relative to the space or groove location until the desired number of straight line cuts have been made and the tooth space or groove has been completely formed. The cutter then will overrun into the indexing position and the disk will be rotated about the axis 25 to place a new tooth space or groove location in operative relation to the path of movement of the cutter. This procedure will continue until the face 14 of the disk 10 is completely formed.

While the method herein described, and the forms of apparatus for carrying out this method, constitute the preferred embodiments of the invention, it is to be understood that the invention is not limited to this precise method and forms of apparatus, and that changes may be made therein without departing from the spirit of the invention or the scope of the subjoined claims.

Having thus described the invention, I claim:

1. A method of producing teeth on one face of a disk shaped member, comprising indexing the member about its true axis to the locations for the spaces between adjacent teeth, between each of said indexing movements effecting several angular adjustments of the member about an axis arranged at an acute angle with respect to said true axis and which passes through said member, and after each one of said angular adjustments about said second mentioned axis removing a straight line cut of material that extends from the periphery of the member in the direction of its movement axis to form the sides of the adjacent teeth and the bottoms of the grooves between said sides.

2. A method of producing teeth on one face of a disk shaped member, comprising indexing the member about its true axis to the locations for the spaces between adjacent teeth, between each of said indexing movements effecting several angular adjustments of the member about an axis that is at an acute angle with respect to said true axis, and removing a straight line cut of material after each one of said angular adjustments to form the grooves between the teeth and including the flanks of the teeth.

3. A method of producing teeth on one face of a disk shaped member, comprising indexing the member about its true axis to the locations for the spaces between adjacent teeth, between each of said indexing movements effecting several angular adjustments of the member about an axis that is at an acute angle with respect to said true axis, and after each one of said angular adjustments about each one of said second mentioned axes removing a straight line cut of material from said face of the member that extends from the periphery of the member in the direction of its movement axis, the first two of said cuts completely forming the sides or flanks of adjacent teeth while starting a groove between said teeth, and the remaining cuts completing the formation of said groove.

4. A method of producing radial teeth on the faces of conical disks, comprising indexing each disk about its true axis to the locations for the spaces that will occur between all of the teeth, moving the disk several times at each one of said space locations about an axis which is normal to the surface of the disk at said location, and after each one of the movements at each location removing a straight line cut of material extending radially of the said normal axis for that movement to form an inwardly tapered groove which will define the sides of the adjacent teeth.

5. A method of producing radial teeth on the faces of conical disks, comprising indexing each disk about its true axis to the locations for the spaces occurring between all of the teeth, moving the disk several times at each one of said space locations about an axis which is normal to the surface of the disk at said location, and after each one of the movements at each location, causing a cutting tool to traverse the disk face to remove a straight line cut of material along a path extending radially of the said normal axis for that movement to form a groove which will define the adjacent sides of two teeth.

6. A method of producing radial teeth on the faces of conical disks, comprising indexing each disk about its true axis to the locations for the spaces occurring between all of the teeth, moving the disk several times at each one of said space locations about an axis which is normal to the surface of the disk at said location, and after each one of the movements at each location, causing a reciprocatory tool to traverse the disk face to remove during each stroke a straight line cut of material along a path extending radially of the said normal axis for that movement to form a groove which will define the adjacent sides of two teeth.

7. A method of producing radial teeth on the faces of conical disks, comprising indexing each disk about its true axis to the locations for the spaces occurring between all of the teeth, moving the disk several times at each one of said space locations about an axis which intersects the inner end of the space and is angularly arranged with respect to said true axis, and at each one of said locations removing sufficient material from the disk face to form a groove of uniform depth which will define the adjacent sides of two teeth.

8. A method of producing radial teeth on the faces of conical disks, comprising indexing each disk about its true axis to the locations for the spaces occurring between all of the teeth, moving the disk several times at each one of said space locations about an axis which intersects the inner end of the space location and is angularly arranged with respect to said true axis, and at each one of said locations removing sufficient material from the disk face, by a combination of up-milling and down-milling, to form a grove of uniform depth which will define the adjacent sides of two teeth.

9. A method of producing radial teeth on the faces of conical disks, comprising indexing each disk about its true axis to the locations for the spaces occurring between all of the teeth, moving the disk several times at each one of said space locations about an axis which intersects the inner end of the space location and is angularly arranged with respect to said true axis, and, at each one of said locations, after the first one of said movements causing a cutting tool to traverse the disk face from the periphery of the disk to the location of the intersecting axis to remove a cut of material which will define the side of one tooth, after the second movement causing the tool to traverse the disk face from the location of the intersecting axis to the periphery of the disk to remove a cut of material which will define the adjacent side of another tooth, and after the subsequent movements causing the tool to traverse the disk face in reverse radial directions to remove the wedge of material left between the first two cuts.

10. A method of producing radial teeth on the faces of conical disks, comprising indexing each disk about its true axis to the locations for the spaces occurring between all of the teeth, moving the disk several times at each one of said space locations about an axis which intersects the inner end of the space location and is angularly arranged with respect to said true axis, and, at each one of said locations, after the first one of the movements causing a cutting tool to traverse the disk face from the periphery of the disk to the location of the intersecting axis to remove a cut of material which will define the side of one tooth, after the second movement causing the tool to traverse the disk face from the location of the intersecting axis to the periphery of the disk to remove a cut of material which will define the adjacent side of another tooth, and after the subsequent movements causing the tool to traverse the disk face with relatively shorter radial strokes than the first two strokes to remove the wedge of material left by the first two cuts.

11. A method of producing radial teeth on the faces of conical disks, comprising indexing each disk about its true axis to the locations for the spaces occurring between all of the teeth, between each of said indexing movements effecting several angular adjustments of the member about an axis arranged at an acute angle with respect to said true axis, and removing sufficient material after each one of said angular adjustments by alternate up-milling and down-milling strokes radially arranged with respect to said second mentioned axis to form the flanks of adjacent teeth and to remove the wedge of material remaining between said flanks.

12. A method of producing radial teeth on the faces of conical disks, comprising indexing each disk about its true axis to the locations for the spaces occurring between all of the teeth, moving the disk several times at each one of said space locations about an axis which is normal to the surface of the disk at said location, and after said movements removing straight line cuts extending radially from said location axis by alternate up-milling and down-milling strokes to form the flanks of adjacent teeth and to remove the material remaining between said flanks.

13. A method of producing radial teeth on the faces of conical disks, comprising indexing each disk about its true axis to the locations for the spaces occurring between all of the teeth, moving the disk several times at each one of said space locations about an axis which is normal to the face of the disk at said location, and after said movements removing straight line, partially overlapping cuts of uniform depth radiating from said location axis by alternate up-milling and down-milling strokes to form the flanks of adjacent teeth and to remove the wedge of material left between said flanks.

14. A method of producing radial teeth on the faces of conical disks, comprising indexing each disk about its true axis to the locations for the spaces occurring between all of the teeth, and, at each one of said space locations, moving the disk to a first position about an axis angularly arranged with respect to said true axis and intersecting the space location at its inner end portion, removing a straight line cut of material that terminates at the disk periphery and at the intersection of the said angularly arranged axis and the space location to form a flank of one tooth, moving the disk to a second position about said angularly arranged axis, removing a straight line cut of material that also terminates at the disk periphery and the intersection of the angular axis with the space location to form a flank of an adjacent tooth, moving the disk to a third position about said angular axis, removing a straight line cut off of one side of the wedge of material left standing between the first two cuts, moving the disk to a fourth position, removing a straight line cut off of the second side of the wedge of material, moving the disk to a fifth position, removing a straight line cut off of the last mentioned side of the said wedge of material, moving the disk to a sixth position, and removing the last of the said wedge of material by a final straight line cut.

15. A method of producing radial teeth on the faces of conical disks, comprising indexing each disk about its true axis to the locations for the spaces that will occur between all of the teeth, and, at each one of said space locations, moving the disk to a first position about an axis angularly arranged with respect to said true axis and intersecting the space location at its inner end portion, removing a straight line cut of material that terminates at the disk periphery and at the intersection of the said angularly arranged axis with the space location by a stroke of a tool in one direction to form a flank of one tooth, moving the disk to a second position about said angularly arranged axis, removing a straight line cut of material that also terminates at the disk periphery and the intersection of the angular axis with the space location by a stroke of the tool in the reverse direction to form a flank of an adjacent tooth, moving the disk to a third position about said angular axis, removing a straight line cut off of one side of the wedge of material left standing between the first two cuts by a stroke of the tool in the first mentioned direction, moving the disk to a fourth position, removing a straight line cut off of the second side of the wedge of material by a stroke of the tool in the said reverse direction, moving the disk to a fifth position, removing a straight line cut off of the last mentioned side of the said wedge of material by a stroke of the tool in the first mentioned direction, moving the disk to a sixth position, and removing the last of the said wedge of material by a final straight line cut produced by a stroke of the tool in the said reverse direction.

16. A method of producing radial teeth on the faces of conical disks, comprising indexing each disk about its true axis to the locations for the spaces occurring between all of the teeth, and, at each one of said space locations, moving the disk to a first position about an axis angularly arranged with respect to said true axis and intersecting the space at its inner end portion, removing a straight line cut of material by up-milling that terminates at the disk periphery and at the intersection of the said angularly arranged axis with the space location to form a flank of one tooth, moving the disk to a second position about said angularly arranged axis, removing a straight line cut of material by down-milling that also terminates at the disk periphery and the intersection of the angular axis with the space location to form a flank of an adjacent tooth, moving the disk to a third position about said angular axis, removing by up-milling a straight line cut off of one side of the wedge of material left standing between the first two cuts, moving the disk to a fourth position, removing by down-milling a straight line cut off of the second side of the wedge of material, moving the disk to a fifth position, removing by up-milling a straight line cut off of the last mentioned side of the said wedge of material, moving the disk to a sixth position, and removing by down-milling the last of the said wedge of material by a final straight line cut.

17. A method of producing a radially tapered groove in the face of a conical disk, comprising supporting the disk for oscillatory movements about an axis which is normal to the portion of the disk face to receive the groove and which intersects the inner end of said portion, oscillating the disk several times about said axis with the different oscillations varying in amplitude, causing the disk to pause after each oscillation, and during each pause removing a straight line cut of material extending radially of said axis.

18. A method of producing a radially tapered groove in the face of a conical disk, comprising supporting the disk for oscillatory movement about an axis which is normal to the portion of the disk face to receive the groove and which intersects the inner end of said portion, oscillating the disk several times about said axis with the different oscillations varying in amplitude, causing the disk to pause between oscillations, and during said pauses removing straight line cuts of material by alternate up-milling and down-milling strokes extending radially of said axis.

19. A method of producing teeth on one face of a disk shaped member, comprising indexing the member about one axis to the locations of spaces between adjacent teeth, between each of said indexing movements effecting several angular adjustments of the member about an axis arranged at an acute angle with respect to the first axis, and removing a straight line cut of material after each one of said angular adjustments to form the grooves between the teeth and including the flanks of the teeth.

20. A method of producing teeth on one face of a disk shaped member, comprising indexing the member about one axis to the locations of the spaces between adjacent teeth, between each of said indexing movements effecting several angular adjustments of the member about an axis arranged at an acute angle with respect to the first axis, and after each one of said angular adjustments causing a cutting tool to traverse the face of the member in a direction that is radial of the axis for said angular adjustments to remove material to form the grooves between the teeth and including the flanks of the teeth.

21. A method of producing teeth on one face of a disk shaped member, comprising indexing the member about one axis to the locations of the spaces between adjacent teeth, between each of said indexing movements effecting several angular adjustments of the member about an axis arranged at an acute angle with respect to the first axis, and after each one of said angular adjustments causing a milling tool to traverse the face of the member in a direction that is radial of the axis for said angular movements to remove material to form the grooves between the teeth and including the flanks of the teeth.

22. A method of producing teeth on one face of a disk shaped member, comprising indexing the member about one axis to the locations of the spaces between adjacent teeth, between each of said indexing movements effecting several angular adjustments of the member about an axis arranged at an acute angle with respect to the first axis, and removing a straight line cut of material after each one of said angular adjustments by causing a reciprocating tool to traverse the face of the member in a direction that is radial of the axis for said angular adjustments to form the grooves between the teeth and including the flanks of the teeth.

23. A method of producing teeth on one face of a disk shaped member, comprising indexing the member about one axis to the locations of the spaces between adjacent teeth, between each of said indexing movements oscillating the member several times about an axis arranged at an acute angle with respect to the first axis with the different oscillations varying in amplitude, causing the member to pause after each oscillation, and removing a straight line cut of material during each pause of the member to form the grooves between the teeth and including the flanks of the teeth.

24. A method of producing teeth on one face of a disk shaped member, comprising indexing the member about one axis to the locations of the spaces between adjacent teeth, between each of said indexing movements oscillating the member several times about an axis arranged at an acute angle with respect to the first axis with the different oscillations varying in amplitude, causing the member to pause after each oscillation, and during each pause of the member causing a cutting tool to traverse the face of the member in a direction that is radial of the axis of oscillation to remove material from the member.

25. A method of producing teeth on one face of a disk shaped member, comprising indexing the member about one axis to the locations of spaces between adjacent teeth, between each one of said indexing movements effecting several angular adjustments of the member about an axis arranged at an acute angle with respect to the first axis, and removing sufficient material after each one of said angular adjustments to form the groove between the teeth and including the flanks of the teeth.

26. A method of producing teeth on one face of a disk shaped member, comprising indexing the member about one axis to the locations of the spaces between adjacent teeth, between each of said indexing movements oscillating the member several times about an axis arranged at an acute angle with respect to the first axis with the different oscillations varying in amplitude, causing the member to pause after each oscillation, and removing sufficient material during each pause of the member to form the grooves between the teeth and including the flanks of the teeth.

HENRY G. KELLER.